United States Patent
Park et al.

(10) Patent No.: US 8,279,278 B2
(45) Date of Patent: Oct. 2, 2012

(54) APPARATUS FOR PHOTOGRAPHING PIPE WITHOUT SUSPENSION OF WATER SUPPLY AND SYSTEM FOR CONTROLLING THE SAME

(75) Inventors: Hyuk-Sung Park, Jungnang-gu (KR); Kyeong-Soo Min, Gwangju-si (KR); Sang-Bong Park, Yongin-si (KR); Kyeong-Sub Lee, Namyangju-si (KR); Dong-Hyun Kim, Haeundae-gu (KR); Mun-Suk Chun, Jungnang-gu (KR); Dong-Sung Joo, Seongnam-si (KR); Hae-Sung Park, Yongin-si (KR); Jae-Yeon Ryu, Gwangjin-gu (KR); Sung-Joon Ko, Seodaemun-gu (KR)

(73) Assignees: Water Resources Engineering Corporation, Seoul (KR); Robogen Co., Ltd., Seoul (KR)

( * ) Notice: Subject to any disclaimer, the term of this patent is extended or adjusted under 35 U.S.C. 154(b) by 1226 days.

(21) Appl. No.: 12/054,926

(22) Filed: Mar. 25, 2008

(65) Prior Publication Data

US 2009/0028543 A1    Jan. 29, 2009

(30) Foreign Application Priority Data

Jul. 27, 2007 (KR) .................. 10-2007-0075913
Dec. 12, 2007 (KR) .................. 10-2007-0128770

(51) Int. Cl.
*H04N 7/18* (2006.01)
(52) U.S. Cl. .................. 348/84; 348/81; 348/85
(58) Field of Classification Search .................. 348/85, 348/81, 84; 324/338; 166/66.5; 73/152.46
See application file for complete search history.

(56) References Cited

U.S. PATENT DOCUMENTS

| | | | |
|---|---|---|---|
| 5,767,400 A * | 6/1998 | Nakano et al. | 73/152.46 |
| 6,431,270 B1 * | 8/2002 | Angle | 166/66.5 |
| 7,002,620 B1 * | 2/2006 | Rutledge | 348/85 |
| 2003/0052686 A1 * | 3/2003 | Andreasen | 324/338 |

OTHER PUBLICATIONS

Water resource engineering Corporation, we always stand by you! (water Korea Technical Brouchure), p.(6).
Translation of Water Korea Techiical Brouchure, Apparatus for diagnosing interior of pipe without suspension of water supply Translator: Juhyun JEON, p.(1).
Water Korea Brouchure, Water & Sewerage Exhibition Nov. 19-22, 2007 KINTEX, The host organization, Korea water and Wastewater works Association, pp.(8).

* cited by examiner

*Primary Examiner* — Le H Luu
(74) *Attorney, Agent, or Firm* — Oblon, Spivak, McClelland, Maier & Neustadt, L.L.P.

(57) ABSTRACT

An apparatus for photographing a pipe without suspension of water supply and a system for controlling the same are disclosed. According to present invention, the interior of the pipe can be photographed by inserting the camera into the pipe and moving and rotating the camera without halting water supply, and information about the movement and rotation of the camera can be produced. A problem of discontinuance of using the whole pipe due to photographing of the interior of the pipe can be prevented. The camera can accurately photograph respective portions in the pipe by precisely moving forward/backward and rotating left/right or up/down. Since information about a practical position in the pipe with respect to the photographed image is provided, a user can accurately grasp a defect-position in the pipe, and can easily control the camera.

25 Claims, 11 Drawing Sheets

APPARATUS FOR PHOTOGRAPHING PIPE WITHOUT SUSPENSION OF WATER SUPPLY AND SYSTEM FOR CONTROLLING THE SAME

BACKGROUND OF THE INVENTION

1. Field of the Invention

The present invention relates to an apparatus for photographing a pipe without suspension of water supply and a system for controlling the same, and more particularly, to an apparatus for photographing a pipe without suspension of water supply capable of photographing and inspecting an inside of a pipe without halting fluid flow in the pipe while minimizing water leakage and a system for controlling the photographing apparatus.

2. Description of the Related Art

Generally, as a pipe such as a water supply pipe is used for a long period, foreign substances such as sphagna or scales are formed in an inside of the pipe, and obstruct water flow. Also, inner surfaces of valves connected to the pipe corrode, and this causes water leakage.

To solve this problem, the internal state of the pipe is inspected by photographing the inside of the pipe periodically. In a case where the pipe has a relatively large diameter, a photographing robot, which can be remote-controlled, is put into the pipe to inspect the inside of the pipe. In a case where the pipe has a relatively small diameter, the water supply into the pipe is halted, and then an endoscope camera is put into the pipe to photograph the inside of the pipe.

However, the above conventional pipe inspecting method has a problem such that the supply of fluid such as water into the pipe should be halted in order to perform the inspection, and the suspension of water supply inflicts a tremendous loss on various industrial facilities and causes inconvenience to people's living.

SUMMARY OF THE INVENTION

Therefore, the present invention has been made in view of the above problems, and it is an object of the present invention to provide an apparatus for photographing a pipe without suspension of water supply, which can photograph and inspect an inside of a pipe without halting fluid flow in the pipe while minimizing water leakage.

It is another object of the present invention to provide an apparatus for photographing a pipe without suspension of water supply, which can move a camera smoothly by securely coupling a main housing to an end of the pipe.

It is another object of the present invention to provide an apparatus for photographing a pipe without suspension of water supply, which can prevent water leakage through a gap between a moving shaft and a main housing.

It is another object of the present invention to provide an apparatus for photographing a pipe without suspension of water supply, which can prevent a moving shaft from moving by its own weight.

It is another object of the present invention to provide an apparatus for photographing a pipe without suspension of water supply, which can smoothly insert or separate a moving shaft into/from the pipe of high water pressure by a simple constitution.

It is another object of the present invention to provide an apparatus for photographing a pipe without suspension of water supply, which can prevent a pulley from being rotated in a reverse direction due to water pressure.

It is another object of the present invention to provide an apparatus for photographing a pipe without suspension of water supply, which can easily operate a moving shaft only with a small force.

It is another object of the present invention to provide an apparatus for photographing a pipe without suspension of water supply, which can prevent damage of a camera due to water pressure, easily mount the camera to an end of a moving shaft, and adjust a direction of the camera toward an inner wall of the pipe.

It is another object of the present invention to provide an apparatus for photographing a pipe without suspension of water supply, which can easily adjust a photographing angle of a camera at an outside of the pipe.

It is another object of the present invention to provide an apparatus for photographing a pipe without suspension of water supply, which can easily adjust a photographing angle of a camera even at high water pressure by a simple constitution.

It is another object of the present invention to provide an apparatus for photographing a pipe without suspension of water supply, which can prevent water leakage while easily arranging cables for connecting power and signal terminals of a camera unit.

It is another object of the present invention to provide an apparatus for photographing a pipe without suspension of water supply, which can insert a camera into a pipe in a water supply state, photograph an inside of the pipe by moving and rotating the camera, and derive information about the movement and rotation of the camera.

It is another object of the present invention to provide an apparatus for photographing a pipe without suspension of water supply, which can accurately photograph respectively corresponding positions of an inside of a pipe by precisely moving a camera forward and backward and rotating the camera left/right or up/down.

It is another object of the present invention to provide an apparatus for photographing a pipe without suspension of water supply, which can accurately derive information without an error, about forward and backward movement and left/right or up/down rotation of the camera.

It is another object of the present invention to provide an apparatus for photographing a pipe without suspension of water supply, which can photograph an inside of the pipe with a clear image quality and measure an internal state of the pipe.

It is another object of the present invention to provide an apparatus for photographing a pipe without suspension of water supply, which can move and rotate a camera, derive information about the movement and rotation of the camera, and display the information with a photographed image.

It is another object of the present invention to provide an apparatus for photographing a pipe without suspension of water supply, which can receive a control order, inputted by a user, related to a camera or display.

It is another object of the present invention to provide an apparatus for photographing a pipe without suspension of water supply, which can provide a user with information about an internal state of the pipe as well as image information of the pipe.

It is another object of the present invention to provide an apparatus for photographing a pipe without suspension of water supply, which can store an image and an internal state of the pipe to reinvestigate them later, and process information about a defect of the pipe.

In accordance with an aspect of the present invention, the above and other objects can be accomplished by the provision of an apparatus for photographing a pipe without suspension of water supply, comprising: a camera unit to photograph an interior of a pipe; and a mechanism unit to support and to move and rotate the camera unit. Accordingly, the apparatus photographs the interior of the pipe without halting water supply into the pipe.

The mechanism unit includes: a main housing coupled to an end of the pipe; a moving shaft inserted in the main housing to move forward and backward and rotate in the pipe, and the moving shaft being coupled with the camera unit at an end thereof; and a manipulation part to move the moving shaft from a portion of the main housing into the pipe. Preferably, the main housing is formed with a through-hole, through which the moving shaft is inserted and moves, and is provided with a flange at an end thereof, which is to be coupled to an end of the pipe. Preferably, the mechanism unit further includes a sealing packing provided in the main housing to seal a space between the moving shaft and the main housing. Preferably, the mechanism unit further includes a moving shaft stopper provided at an outer end of the main housing to fix the movement of the moving shaft.

The manipulation part includes: a manipulation handle rotatably coupled to a portion of the main housing; a pulley coupled to the manipulation handle so as to be rotated; and a wire having a first end wound on the pulley and a second end fixed to an end of the moving shaft. Preferably, the manipulation part further includes a ratchet gear coupled to a portion of the pulley, and a ratchet stopper provided adjacent to the ratchet gear to prevent reverse rotation of the pulley. Preferably, the manipulation part further includes a speed reduction gear provided between the manipulation handle and the pulley.

Preferably, the mechanism unit further includes a camera housing hingedly coupled to an end of the moving shaft so as to be tilted left and right, and the camera unit is fixedly inserted in the camera housing.

Preferably, the mechanism unit further includes a tilting operation part to tilt the camera housing left and right at an exterior of the pipe. The tilting operation part includes: a sliding shaft provided to move forward and backward in the moving shaft; and a tilting bracket having a first end hingedly coupled to the sliding shaft, and a second end hingedly coupled to an outer portion of the camera housing at a position deviated from a center of the sliding shaft.

Preferably, the moving shaft is formed with a cable connecting passage through the moving shaft, through which a cable connected with the camera unit is extended outside, and the mechanism unit further includes a cable packing provided at a rear end of the moving shaft to prevent fluid leakage through the cable connecting passage.

In accordance with another aspect of the present invention, there is provided an apparatus for photographing a pipe without suspension of water supply, comprising: a camera unit to photograph an interior of a pipe; a mechanism unit to support and to move and rotate the camera unit; and an encoder unit to produce signals corresponding to information about that the mechanism unit moves and rotates the camera unit.

The mechanism unit moves the camera unit forward and backward, or rotates the camera unit left and right or up and down.

The encoder unit includes: a first encoder to produce a first signal corresponding to movement information about that the mechanism unit moves the camera unit forward and backward; a second encoder to produce a second signal corresponding to left/right rotation information about that the mechanism unit rotates the camera unit left and right; and a third encoder to produce a third signal corresponding to up/down rotation information about that the mechanism unit rotates the camera unit up and down. The encoder unit includes an encoder which is automatically closely contacted with the mechanism unit, and the encoder includes a pressing spring to closely contact the encoder to the mechanism unit in one axial direction.

The camera unit includes: a camera to output an image signal, a zoom information signal and a focus information signal in photographing the interior of the pipe; a laser device to irradiate a beam for indicating an intended direction of the camera; a temperature sensor to measure a temperature in the pipe and produce a temperature signal; and an illumination device to provide illumination for photographing the interior of the pipe.

In accordance with another aspect of the present invention, there is provided a system for photographing a pipe without suspension of water supply, comprising: an apparatus for photographing a pipe without suspension of water supply to output a position signal of a camera and an image signal obtained by photographing an interior of a pipe by use of the camera; a control board to produce camera position information and a pipe image respectively based on the position signal and the image signal outputted from the apparatus; a data processing part to generate a three-dimensional animation based on the camera position information and the pipe image produced by the control board; and an interface part to display the three-dimensional animation generated by the data processing part.

The interface part further has a function of receiving a command inputted by a user. The data processing part processes the inputted command and transmits a result value to the interface part, or controls the apparatus according to the command.

The apparatus further outputs a zoom information signal of the camera, a focus information signal of the camera and a temperature signal representing a temperature in the pipe. The control board produces zoom information, focus information and temperature information respectively based on the zoom information signal, the focus information signal and the temperature signal outputted from the apparatus. The data processing part generates a three-dimensional animation based on the position information, the pipe image, the zoom information, the focus information and the temperature information.

Preferably, the system further comprises a memory, and the data processing part stores the three-dimensional animation, the position information and the pipe image in the memory, or stores the three-dimensional animation, the position information, the pipe image, the zoom information, the focus information and the temperature information in the memory. The data processing part further has a defect-position processing function of recording a still image and position information with respect to a defect-position.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings.

Figure 1:
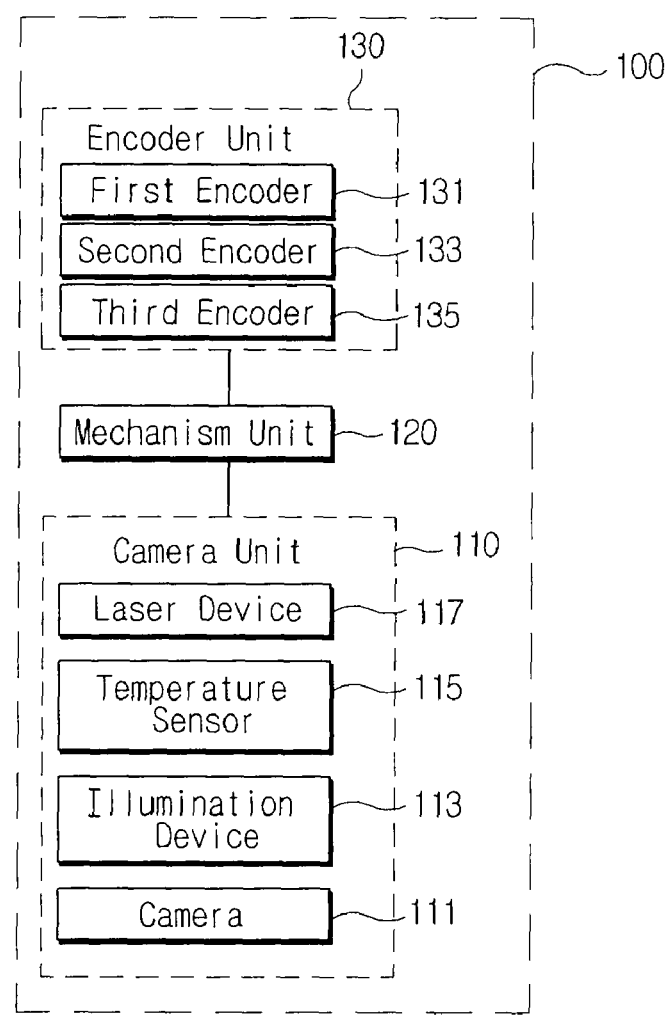
FIG. 1 is a block diagram illustrating a preferred embodiment of an apparatus for photographing a pipe without suspension of water supply according to the present invention.

FIG. 1 is a block diagram illustrating a preferred embodiment of an apparatus for photographing a pipe without suspension of water supply according to the present invention.

Referring to FIG. 1, an apparatus 100 for photographing a pipe without suspension of water supply according to the present invention is used to photograph an internal image of a pipe without halting water supply into the pipe. For this, the apparatus 100 for photographing a pipe without suspension of water supply includes a camera unit 110, a mechanism unit 120 and an encoder unit 130.

The mechanism unit 120 serves to support the camera unit 110, and to move and rotate the camera unit 110. Preferably, the mechanism unit 120 moves the camera unit 110 forward and backward in the pipe, and also rotates the camera unit 110 left/right or up/down with respect to an axis, along which the camera unit 110 is moved forward and backward.

Figure 2:
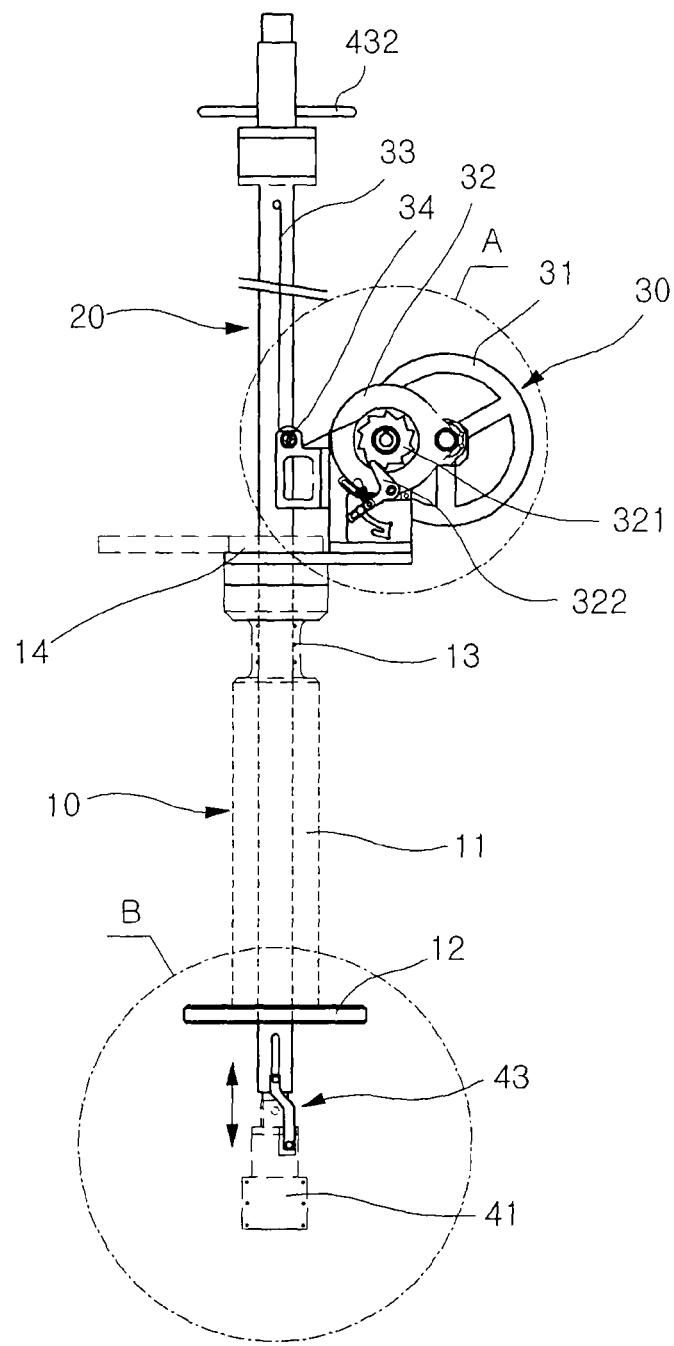
FIG. 2 is a front view illustrating a preferred embodiment of a mechanism unit of the apparatus for photographing a pipe without suspension of water supply according to the present invention.
Figure 3:
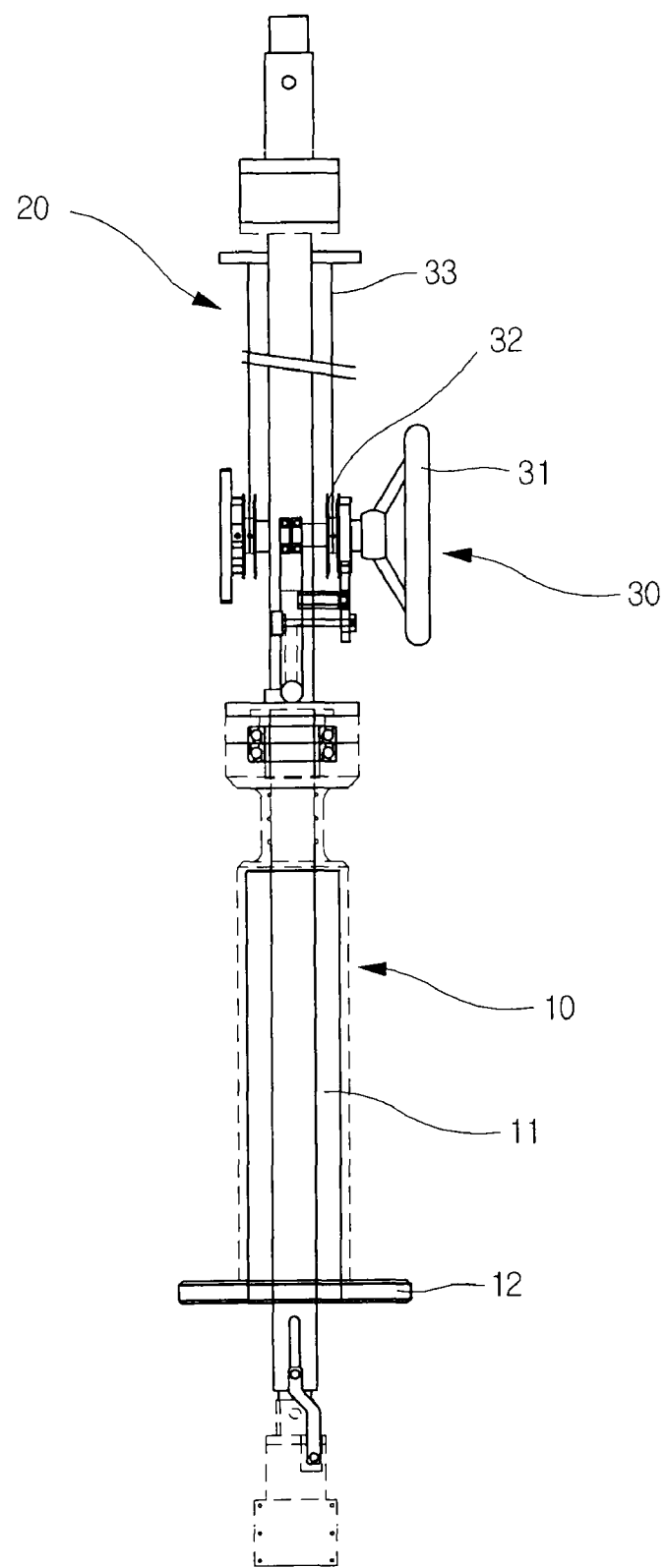
FIG. 3 is a side view illustrating a preferred embodiment of the mechanism unit of the apparatus for photographing a pipe without suspension of water supply according to the present invention.

FIGS. 2 and 3 are a front view and a side view, respectively, illustrating a preferred embodiment of the mechanism unit of the apparatus for photographing a pipe without suspension of water supply according to the present invention.

Referring to FIG. 2, so as to photograph an inside of the pipe without halting water supply into the pipe, the mechanism unit 110 includes a main housing 10 fixedly coupled to an end of the pipe, a moving shaft 20 fitted into the main housing 10 and capable of moving forward and backward and rotating in the pipe, and a manipulation part 30 to move the moving shaft 20 from a portion of the main housing 10 into the pipe.

The main housing 10 coupled to the end of the pipe serves to prevent water leakage from the pipe and make the respective components, of the apparatus 100 for photographing a pipe without suspension of water supply according to the present invention, assembled integrally with each other. The main housing 10 is formed with a through-hole 11, through which the moving shaft 20 is movably inserted. The main housing 10 is provided with a flange 12 at one end, which is coupled to the end of the pipe, so as to prevent the main housing 10 from being separated from the pipe due to high water pressure as well as to make the components coupled securely to each other.

The moving shaft 20 serves to move the camera into the pipe. The moving shaft 20 is formed in a bar-shaped pipe having an outer diameter corresponding to the aforementioned through-hole 11. The camera unit 110 is coupled to a first end of the moving shaft 20. A second end of the moving shaft 20 is exposed to the outside of the main housing 10. Accordingly, the operation of pushing or pulling the moving shaft 20 into/out of the pipe can be easily achieved at the outside of the main housing 10. So as to conveniently adjust the photographing angle, the moving shaft 20 is formed in a cylindrical shape, which can be rotated left and right. When the moving shaft 20 is rotated left and right, the camera unit 110 is also rotated left and right, interlockingly with the moving shaft 20.

In addition, it is preferable to insert at least one sealing packing 13 into a space defined by the main housing 10 and the moving shaft 20, so as to prohibit the water from leaking through a gap between the moving shaft 20 and the main housing 10 while permitting the moving shaft 20 to move up and down relatively to the main housing 10. Thereby, the occurrence of water leakage can be more perfectly prevented during the photographing of the pipe. If the moving shaft 20 moves up and down, the camera unit 110 moves forward and backward with the moving shaft 20 in the pipe.

A moving shaft stopper 14 is provided at an outer end of the main housing 10, and is fixedly coupled to the main housing 10 and the moving shaft 20, so as to fix the movement of the moving shaft 20. Such a moving shaft stopper 14 prevents a problem of inaccurate photographing or damage of the camera unit 110, which might occur by the movement of the moving shaft 20 due to an inner pressure of the pipe or a weight of the moving shaft 20.

Figure 4:
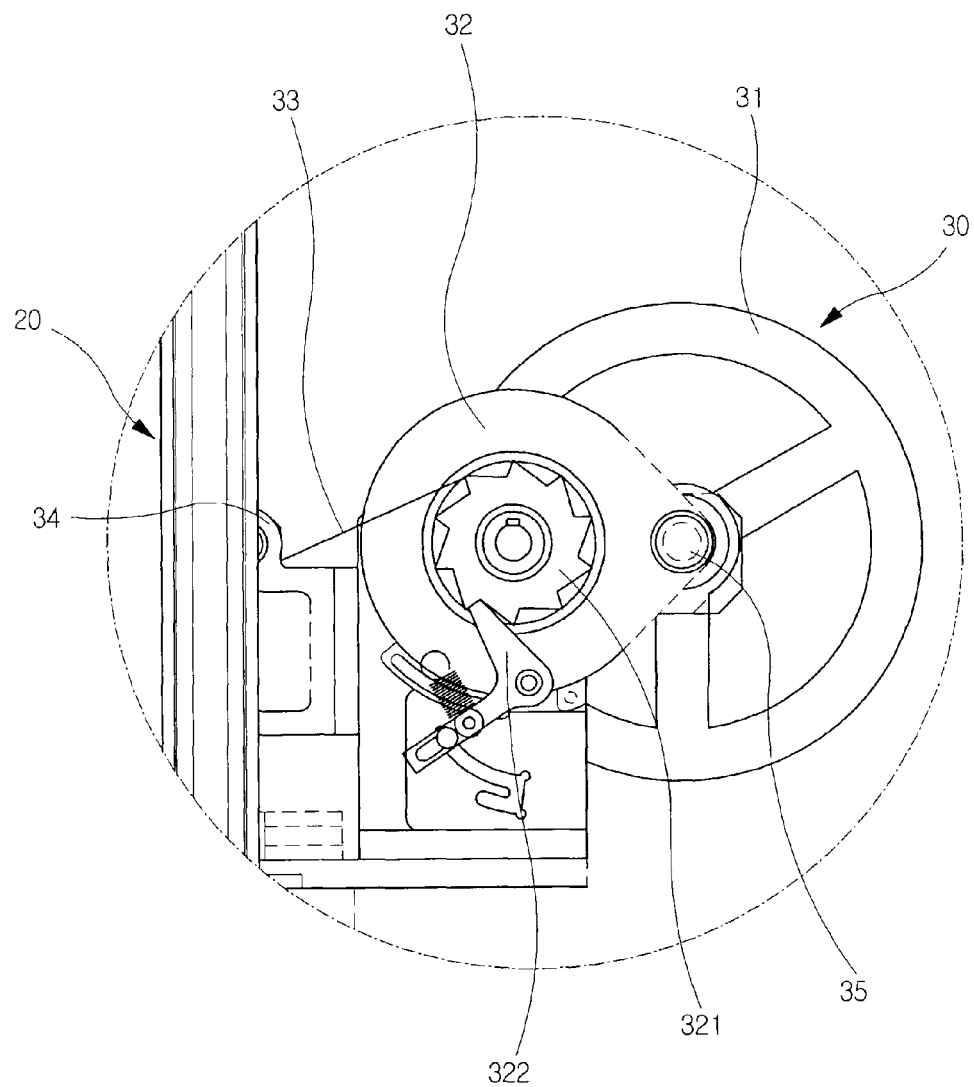
FIG. 4 is a partial enlarged view of an "A" portion in FIG. 2.

FIG. 4 is a partial enlarged view of an "A" portion in FIG. 2.

Referring to FIG. 4, the aforementioned manipulation part 30 is coupled to a portion of the main housing 10, so that a worker handles the manipulation part 30 to move the moving shaft 20 forward and backward in the pipe. The manipulation part 30 includes a manipulation handle 31 rotatably coupled to a portion of the main housing 10, a pulley 32 coupled to the manipulation handle 31 so as to be rotated, and a wire 33 whose a first end is wound on the pulley 32 and a second end is fixed to an outer end of the moving shaft 20.

The manipulation handle 31 is formed in a wheel shape rotatably coupled to a portion of the main housing 10. The pulley 32 is fitted on the same rotating shaft as the manipulation handle 31, or is connected to the manipulation handle 31 through a power transmission means, such as a speed reduction gear 35, a belt or the like. When a worker rotates the manipulation handle 31, the pulley 32 is rotated therewith, and the wire 33 is wound on or unwound from the pulley 32. As such, the worker's operation of rotating the manipulation handle 31 creates increase or decrease in length of the wire 33, which results in the movement of the moving shaft 20 into or out of the pipe.

The power transmission constitution may be modified such that a rotational force of the manipulation handle 31 is transmitted to the pulley 32 by use of a commonly-used power transmission means, such as a belt, a chain or the like. Specifically, it is preferable to arrange the speed reduction gear 35 between the manipulation handle 31 and the pulley 32, so that the rotation can be smoothly achieved even by a small force against a pressure in the pipe.

A ratchet gear 321 is integrally coupled on the rotating shaft of the pulley 32. A ratchet stopper 322 is provided adjacent to the ratchet gear 321, so as to prohibit the rotation of the pulley 32 in a direction of unwinding the wire 33 while permitting the rotation of the pulley 32 in a direction of winding the wire 33. Accordingly, the moving shaft 20 is prevented from being pushed out of the pipe due to an inner pressure of the pipe. As a result, the inaccurate photographing of the internal state of the pipe due to undesirable movement of the moving shaft is prevented.

In addition, a guide roller 34 is provided to guide the wire 33 to the pulley 32. When the wire 33 is wound on or unwound from the pulley 32, the guide roller 34 prevents the wire 33 from being tangled and twisted, thereby securely achieving the smooth winding and unwinding of the wire 33.

A first encoder 131 is provided at the rotating shaft of the pulley 32 to detect the number of revolutions of the pulley 32, and produces a first signal corresponding to information about the forward/backward movement of the camera unit 110. A second encoder 133 detects a rotational angle of the moving shaft 20, and produces a second signal corresponding to information about the left/right rotation of the camera unit 110 by the mechanism unit 120.

Figure 5:
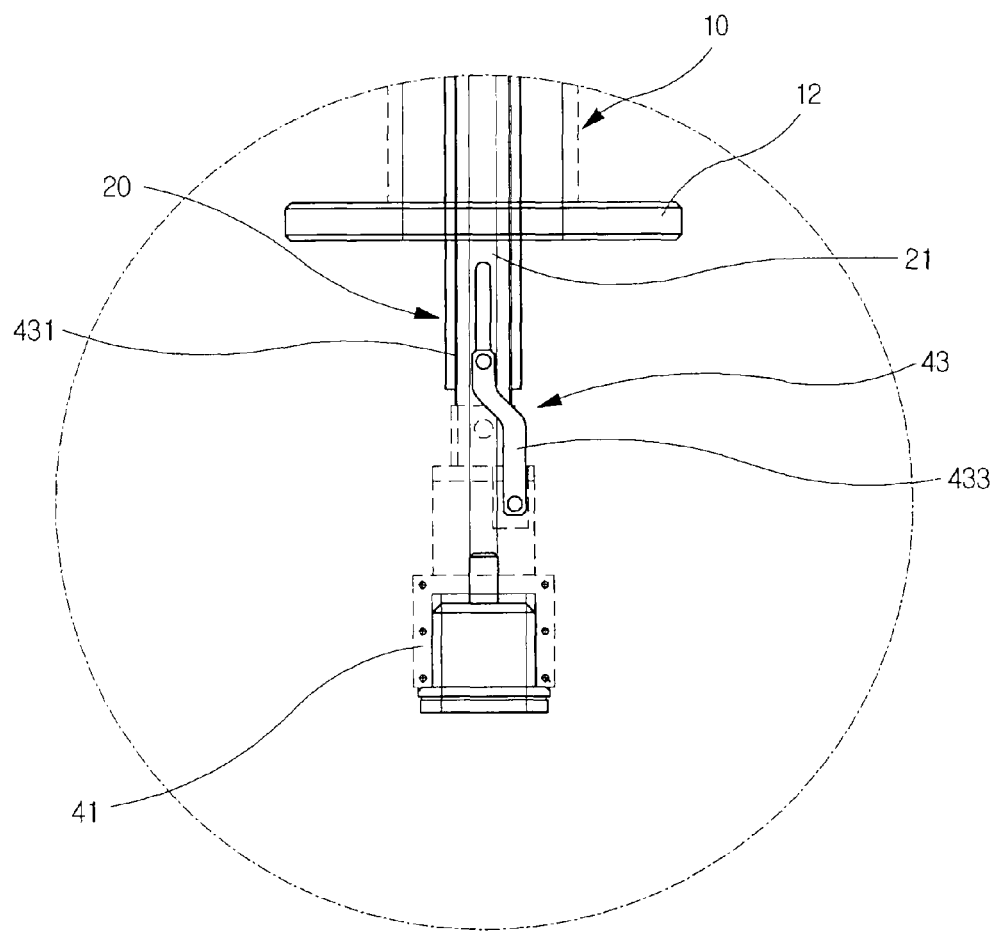
FIG. 5 is a partial enlarged view of a "B" portion in FIG. 2.
Figure 6A:
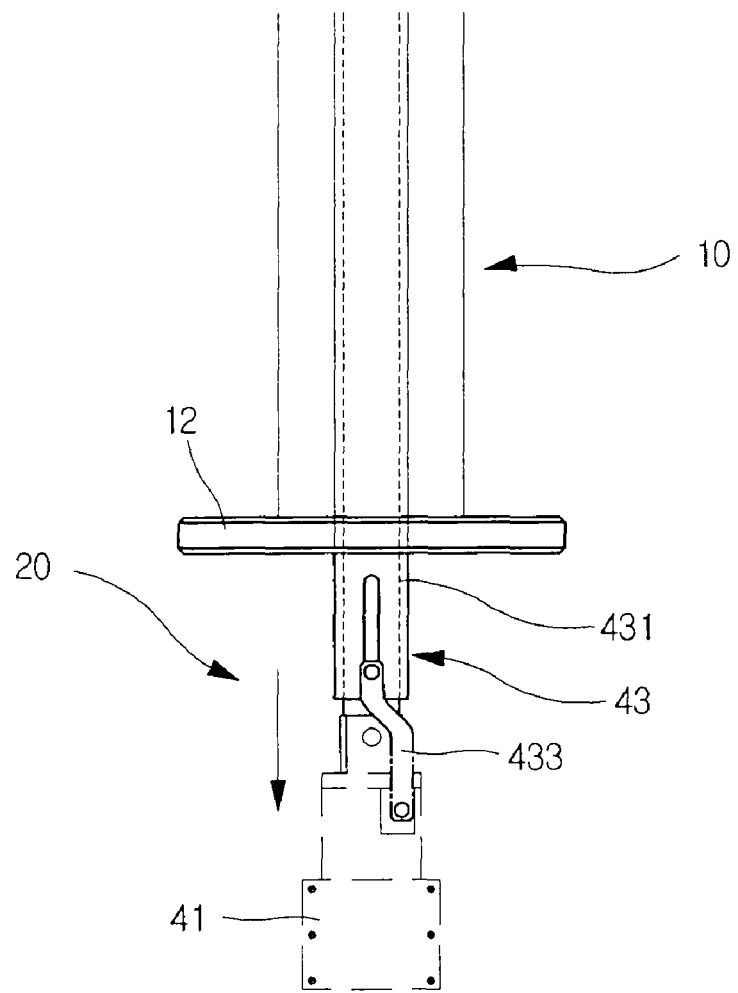
FIGS. 6a and 6b are front views illustrating a principle of rotating a camera unit up and down.
Figure 6B:
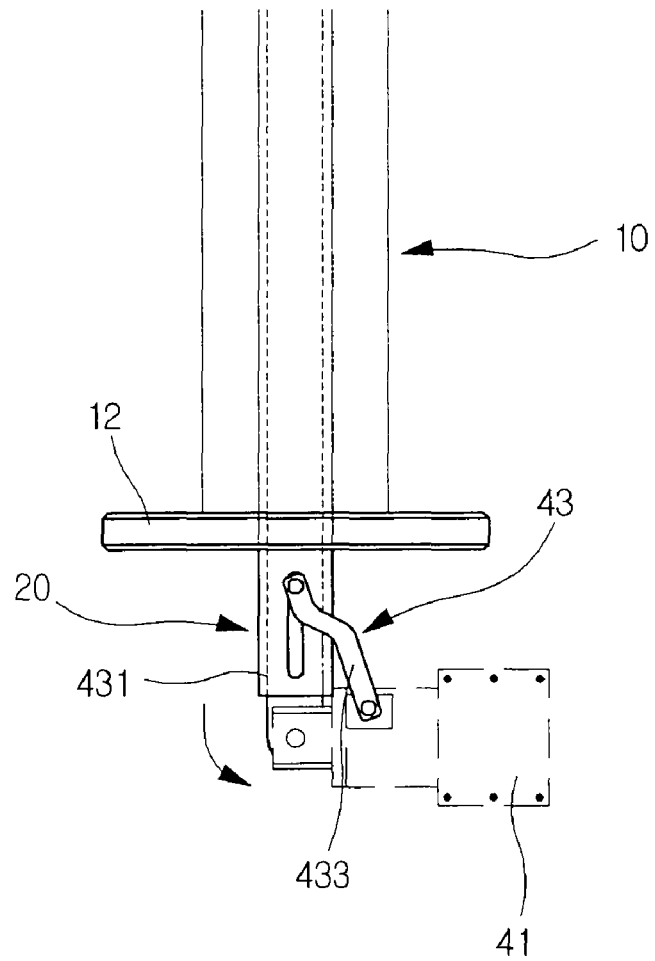

FIG. 5 is a partial enlarged view of a "B" portion in FIG. 2, and FIGS. 6a and 6b are front views illustrating a principle of rotating the camera unit up and down.

Referring to FIGS. 5 to 6b, the camera unit 110 is coupled to an inner end of the moving shaft 20 to photograph the internal state of the pipe. The camera unit 110 is fixedly inserted in a camera housing 41 which is hingedly coupled to the inner end of the moving shaft 20 so as to be rotated sideward.

It is preferred that the camera housing 41 is made of a metal material so as to endure a high pressure in the pipe. One end of the camera housing 41 is hingedly coupled to the end of the aforementioned moving shaft 20, so that the camera housing 41 can be rotated up and down on the moving shaft 20. The camera housing 41 is formed with an inner space, into which the camera unit 110 is fixedly inserted.

Also, the camera housing 41 is connected to the moving shaft 20 by use of a tilting operation means 43, which includes a sliding shaft 431 and a tilting bracket 433, so that a user can tilt the camera housing 41 up and down at the outside of the pipe.

The sliding shaft 431 has a length corresponding to the moving shaft 20, and is coupled so as to slide into or out of the moving shaft 20 along the moving shaft 20. A lower end portion of the sliding shaft 431, to which the camera housing 41 is coupled, is formed with a slot, along which the tilting bracket 433 is moved. If the sliding shaft 431 is moved forward and backward along the moving shaft 20, one end of the tilting bracket 433, which is fitted in the slot, is moved along the slot. The sliding shaft 431 is moved forward and backward along the moving shaft 20 by use of a sliding shaft operation handle 432 which is provided at an outer end of the sliding shaft 431.

One end of the tilting bracket 433, as described above, is coupled to the lower end of the sliding shaft 431, and the other end of the tilting bracket 433 is hingedly coupled to an outer surface of the camera housing 41 at a position deviated from a center of the sliding shaft 431. Thereby, if the sliding shaft 431 is moved toward the camera housing 41, the camera housing 41, which is hingedly coupled to the end of the moving shaft 20, is pivoted sideward by change of an arrangement angle of the tilting bracket 433, and thus the camera unit 110 is rotated up and down. Accordingly, the apparatus 100 for photographing a pipe without suspension of water supply according to the present invention has an effect of easily changing a photographing angle.

A third encoder 135 senses the movement of the sliding shaft 431, and produces a third signal corresponding to the up/down rotational angle of the camera unit 110 of the camera housing 41. Alternatively, the third encoder 135 is provided at the tilting operation means 43 to produce a third signal corresponding to the tilting angle of the camera housing 41.

Preferably, a cable connecting passage 21 is formed through the moving shaft 20, through which a cable connected with the camera unit 110 passes and can be connected to exterior equipment such as a monitor, thereby minimizing exposure of the cable connected with the camera unit 110 to the exterior of the photographing apparatus.

The camera unit 110 serves to photograph the interior of the pipe, and senses information about an internal state of the pipe. To achieve this, the camera unit 110 includes a camera 111, an illumination device 113, a temperature sensor 115 and a laser device 117.

The camera 111 outputs an image signal of an image obtained by photographing the interior of the pipe. The camera 111 also outputs a signal of zoom information and a signal of focus information in photographing the interior of the pipe, together with the image signal.

The illumination device 113 provides illumination for photographing the interior of the pipe. Such an illumination device 113 may be configured as an LED, for example. The apparatus 100 for photographing a pipe without suspension of water supply according to the present invention can more clearly photograph the interior of the pipe by light emitted from the illumination device 113, and can give the clear image to a user.

The temperature sensor 115 serves to produce a temperature signal by sensing a temperature of the pipe and output the temperature signal to the exterior.

The laser device 117 irradiates a beam for indicating an intended direction of the camera 111 so that the accurate intended direction of the camera 111 can be easily confirmed.

The encoder unit 130 produces a signal corresponding to information about that the mechanism unit 120 moves and rotates the camera unit 110, and outputs the signal to the exterior. To achieve this, the encoder unit 130 includes the first encoder 131, the second encoder 133 and the third encoder 135.

Figure 7:
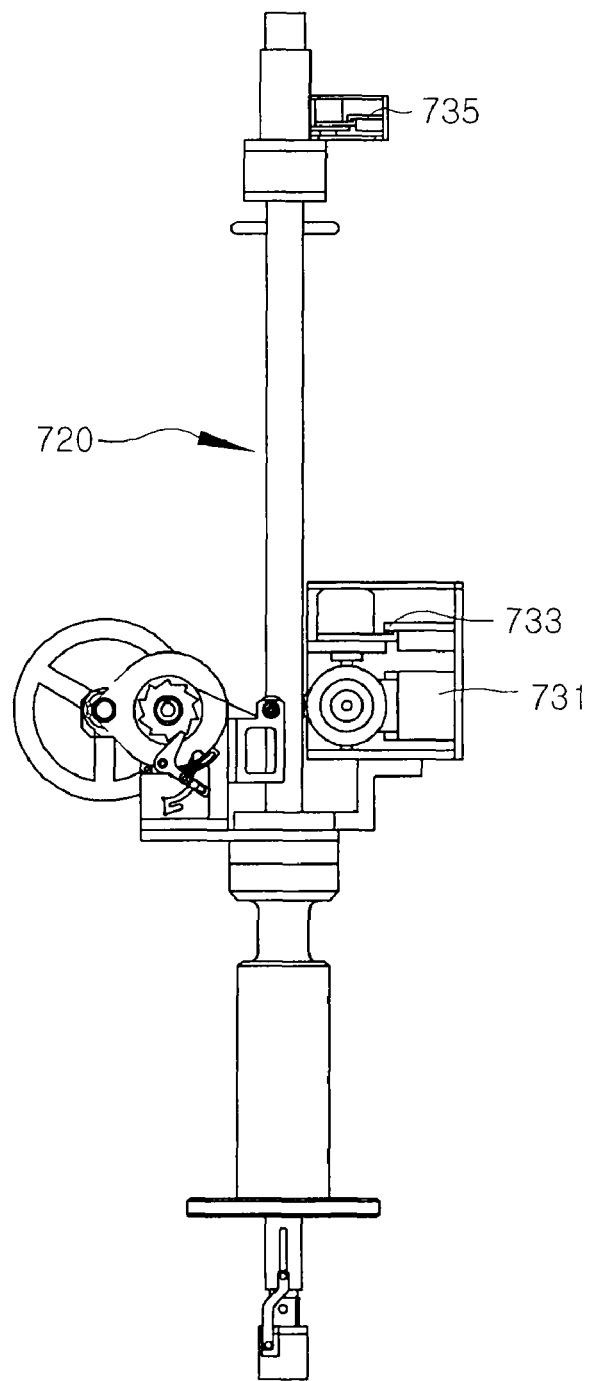
FIG. 7 is a view illustrating a preferred embodiment of mounting an encoder unit to the mechanism unit.

FIG. 7 is a view illustrating a preferred embodiment of mounting an encoder unit to a mechanism unit.

Referring to FIG. 7, a first encoder 731 serves to produce a first signal corresponding to movement information about that a mechanism unit 720 moves the camera unit 110 forward and backward. For instance, the first encoder 731 is coupled to a portion of the mechanism unit 720 to sense the number of revolutions of the rotating shaft of the pulley 32, and produces the first signal corresponding to movement information about that the mechanism unit 720 moves the camera unit 110 forward and backward.

A second encoder 733 serves to produce a second signal corresponding to left/right rotation information about that the mechanism unit 720 rotates the camera unit 110 left and right. For instance, the second encoder 733 is coupled to a portion of the mechanism unit 720 in a manner of being assembled with the first encoder 731, to sense a rotational angle of the moving shaft 20, and produces the second signal corresponding to left/right rotation information about that the mechanism unit 720 rotates the camera unit 110 left and right.

A third encoder 735 serves to produce a third signal corresponding to up/down rotation information about that the mechanism unit 720 rotates the camera unit 110 up and down.

For instance, the third encoder 735 is coupled to an upper portion of the mechanism unit 720 to sense the movement of the sliding shaft 431 and to measure an up/down rotational angle of the camera unit 110 attached to the camera housing 41, and produces the third signal. In another example, the third encoder is provided at the tilting operation means 43 to measure a tilting angle of the camera housing 41, and produces the third signal.

Figure 8:
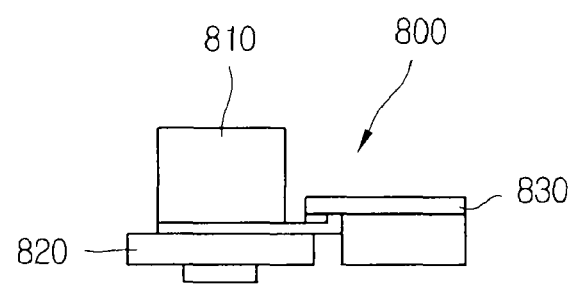
FIG. 8 is a view illustrating a preferred embodiment of an encoder included in the encoder unit.

FIG. 8 is a view illustrating a preferred embodiment of an encoder included in the encoder unit.

Referring to FIG. 8, an encoder 800 is in close contact with the mechanism unit 120 to sense rotation of the respective portions of the mechanism unit 120, produces a signal corresponding to information about the sensed rotation, and outputs the signal. To achieve this, the encoder 800 includes a signal processing part 810, a rotating member 820 and a pressing member 830.

The signal processing part 810 serves to sense rotation of the rotating member 820, to produce a signal corresponding to information about the rotation and to output the signal to the exterior. As one example of a method for sensing the rotation of the rotating member 820, the rotating member 820 is formed with holes arranged with a regular interval, and the signal processing part 810 emits light and determines whether the light passes through the holes, thereby detecting a rotational angle and the number of revolutions of the rotating member 820.

The rotating member 820 is rotated together with the rotation and movement of the elements, whose rotation and movement are to be sensed, such as the pulley 32 and the sliding shaft 431 of the mechanism unit 120. For instance, the rotating member 820 may be configured as a roller. As described above, the rotating member 820 may be formed with holes arranged with a regular interval, through which light passes.

The pressing member 830 presses the signal processing part 810 and the rotating member 820, so as to closely contact the signal processing part 810 and the rotating member 820 in one axial direction. For instance, the pressing member 830 may be configured as a pressing spring. As such, since the pressing member 830 applies a pressing force in one axial direction, the encoder 800 is automatically closely contacted with the mechanism unit 120, and thus can accurately sense the rotation of the mechanism unit 120 without an error. Accordingly, the apparatus 100 for photographing a pipe without suspension of water supply according to the present invention has an effect of accurately producing information about the movement and rotation of the camera without an error which might be generated due to the movement and rotation of the camera.

Figure 9:
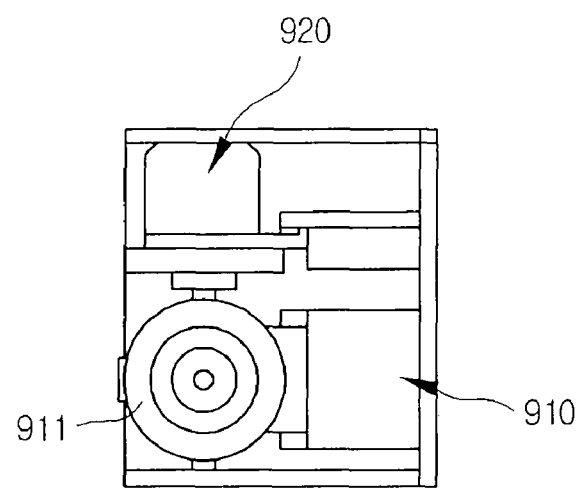
FIG. 9 is a view illustrating an embodiment of coupling a first encoder and a second encoder.

FIG. 9 is a view illustrating an embodiment of coupling a first encoder and a second encoder.

Referring to FIG. 9, a first encoder 910 and a second encoder 920 may be integrally formed. In such a case, the first encoder 910 and the second encoder 920 can be easily and simply mounted or removed to/from the mechanism unit 120. Here, a rotating member 911 is rotated by the rotation of the pulley 32.

Figure 10:
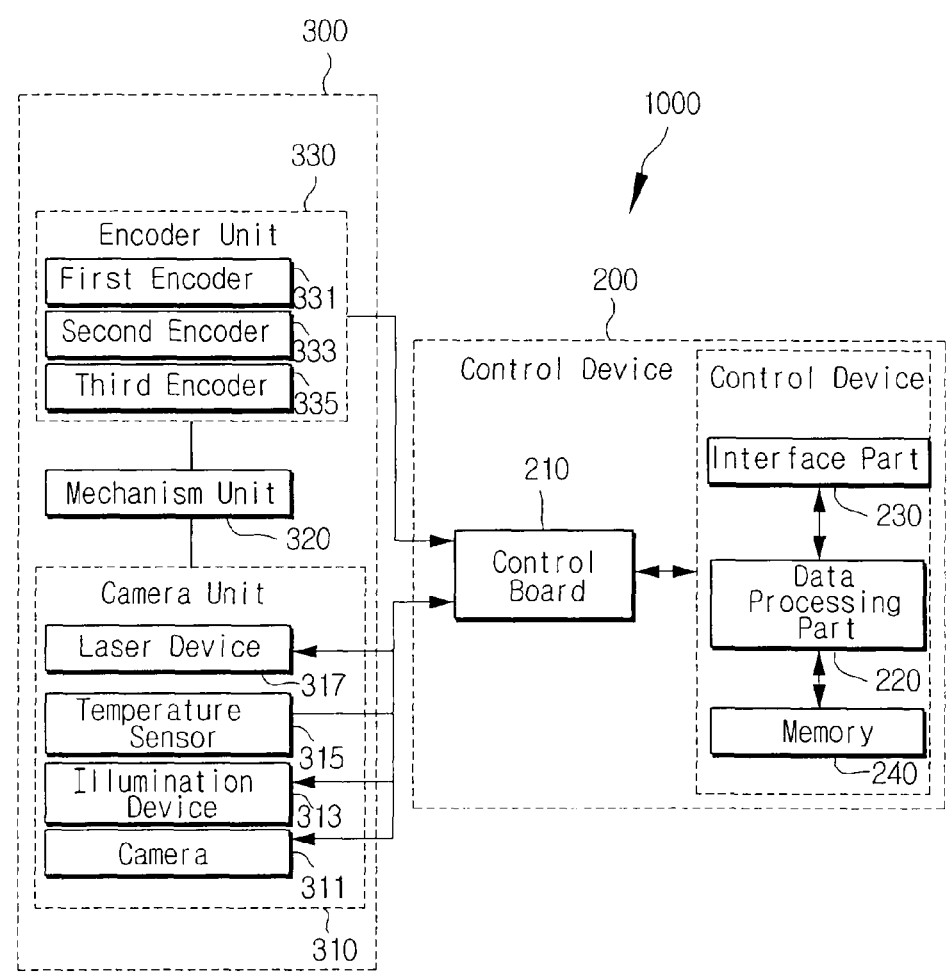
FIG. 10 is a block diagram illustrating a preferred embodiment of a system for controlling the apparatus for photographing a pipe without suspension of water supply according to the present invention.

FIG. 10 is a block diagram illustrating a preferred embodiment of a system for controlling an apparatus for photographing a pipe without suspension of water supply according to the present invention.

Referring to FIG. 10, a system 1000 for controlling an apparatus for photographing a pipe without suspension of water supply according to the present invention, comprises a control device 200 and an apparatus 300 for photographing a pipe without suspension of water supply.

The control device 200 receives a camera position signal, an image signal, a camera direction signal, a zoom information signal, a focus information signal and a temperature signal from the apparatus 300 for photographing a pipe without suspension of water supply. The control device 200 displays the above signals, and controls the apparatus 300 for photographing a pipe without suspension of water supply. To achieve this, the control device 200 includes a control board 210, a data processing part 220, an interface part 230 and a memory 240.

The control board 210 produces camera position information and a pipe image, respectively based on the position signal and the image signal outputted from the apparatus 300 for photographing a pipe without suspension of water supply. The control board 210 also produces camera direction information, zoom information, focus information and temperature information, respectively based on the camera direction signal, the zoom information signal, the focus information signal and the temperature signal outputted from the apparatus 300 for photographing a pipe without suspension of water supply. That is, the control board 210 receives the position signal, the image signal, the camera direction signal, the zoom information signal, the focus information signal and the temperature signal from the apparatus 300 for photographing a pipe without suspension of water supply, and transmits the produced position information, pipe image, camera direction information, zoom information, focus information and temperature information to the data processing part 220.

Also, the control board 210 transmits signals corresponding to control values outputted from the data processing part 220 to a camera unit 310 of the apparatus 300 for photographing a pipe without suspension of water supply. The control values outputted from the data processing part 220 includes an illumination control value for controlling an illumination device 313, a camera control value for controlling zoom and focus of a camera 311, and a laser control value for controlling a laser device 317.

The data processing part 220 displays the information provided from the control board 210, through the interface part 230, so that a user can perceive an internal state of the pipe and control the camera 311. For instance, the data processing part 220 generates a three-dimensional animation based on the position information and the pipe image, which are produced by the control board 210, and displays the animation through the interface part 230. In other words, the data processing part 220 synchronizes the position information and the pipe image, which are produced by the control board 210, and displays the generated three-dimensional animation to a user through the interface part 230 in real time. Accordingly, the system 1000 for controlling the apparatus for photographing a pipe without suspension of water supply according to the present invention has an effect of enabling a user to easily perceive the current state of the pipe and to accurately know the position with respect to the current pipe image.

Also, the data processing part 220 generates a three-dimensional animation by synchronizing together the position information, the pipe image, the camera direction information, the zoom information, the focus information and the temperature information, which are provided from the control board 210, and displays the animation to a user through the interface part 230. Accordingly, a user can easily control the camera 311 through the camera direction information, the zoom information and the focus information with respect to the current pipe image.

The data processing part 220 stores the generated three-dimensional animation, the position information, the pipe image, the camera direction information, the zoom information, the focus information and the temperature information in the memory 240. The data processing part 220 further has a defect-position processing function of recording a still image and position information with respect to a defect-position. In other words, the data processing part 220 captures an image of a defect-position in the pipe from the pipe image, and generates a still image. And, the data processing part 220 stores the generated still image and the defect-position information in the memory 240.

Moreover, the data processing part 220 processes a command, which is inputted by a user through the interface part 230, and displays a result value through the interface part 230, or controls the apparatus 300 for photographing a pipe without suspension of water supply according to the command inputted by a user. For instance, if a user inputs a defect-position detecting command through the interface part 230, the data processing part 220 detects a practical defect-position and size based on the defect-position and camera position information inputted by a user, and generates a three-dimensional animation. And, the data processing part 220 displays the animation through the interface part 230, and stores the animation in the memory 240. In another example, if a user inputs an existing image open command through the interface part 230, the data processing part 220 searches the corresponding three-dimensional animation, position information, pipe image, camera direction information, zoom information, focus information and temperature information, which are stored in the memory 240, and displays them through the interface part 230.

If a user inputs a control command through the interface part 230, the data processing part 220 produces control values corresponding to the control command, and controls the apparatus 300 for photographing a pipe without suspension of water supply. The control values produced by the data processing part 220 include an illumination control value for controlling the illumination device 313, a camera control value for controlling zoom and focus of the camera 311, and a laser control value for controlling the laser device 317.

The interface part 230 displays information and image provided by the data processing part 220, and receives a command from a user. As an example of display, the interface part 230 may display a three-dimensional animation generated by the data processing part 220. As an example of inputted command, the interface part 230 may receive a defect-position processing command, an existing image open command and a control command. The interface part 230 transmits a command inputted from a user to the data processing part 220.

The data processing part 220 stores a three-dimensional animation, position information and a pipe image in the memory 240, or stores a three-dimensional animation, position information, a pipe image, camera direction information, zoom information, focus information and temperature information in the memory 240.

The apparatus 300 for photographing a pipe without suspension of water supply outputs an image signal corresponding to an image obtained by photographing the interior of the pipe without halting the water supply and a position signal corresponding to a position of the camera in image-photographing. To achieve this, the apparatus 300 for photographing a pipe without suspension of water supply comprises a camera unit 310, a mechanism unit 320 and an encoder unit 330.

The camera unit 310 outputs a camera direction signal representing an intended direction of the camera, zoom information signal, focus information signal and a temperature signal representing a temperature in the pipe. To achieve this, the camera unit 310 includes a camera 311, an illumination device 313, a temperature sensor 315 and a laser device 317. The camera unit 310 is a constitutional component corresponding to the camera unit 110 of the aforementioned apparatus 100 for photographing a pipe without suspension of water supply, and the camera 311, the illumination device 313, the temperature sensor 315 and the laser device 317 are constitutional components respectively corresponding to the camera 111, the illumination device 113, the temperature sensor 115 and the laser device 117 of the apparatus 100 for photographing a pipe without suspension of water supply. Therefore, detailed explanation of the above components will be omitted.

The mechanism unit 320 serves to support and to move and rotate the camera unit 310. Since the mechanism unit 320 is a constitutional component corresponding to the mechanism unit 120 of the aforementioned apparatus 100 for photographing a pipe without suspension of water supply, detailed explanation of the mechanism unit 320 will be omitted.

The encoder unit 330 serves to produce a camera position signal corresponding to information about that the mechanism unit 320 moves and rotates the camera unit 310, and outputs the signal to the exterior. To achieve this, the encoder unit 330 includes a first encoder 331, a second encoder 333 and a third encoder 335. The encoder unit 330 is a constitutional component corresponding to the encoder unit 130 of the aforementioned apparatus 100 for photographing a pipe without suspension of water supply, and the first encoder 331, the second encoder 333 and the third encoder 335 are constitutional components respectively corresponding to the first encoder 131, the second encoder 133 and the third encoder 135 of the apparatus 100 for photographing a pipe without suspension of water supply. Therefore, detailed explanation of the above components will be omitted.

Figure 11:
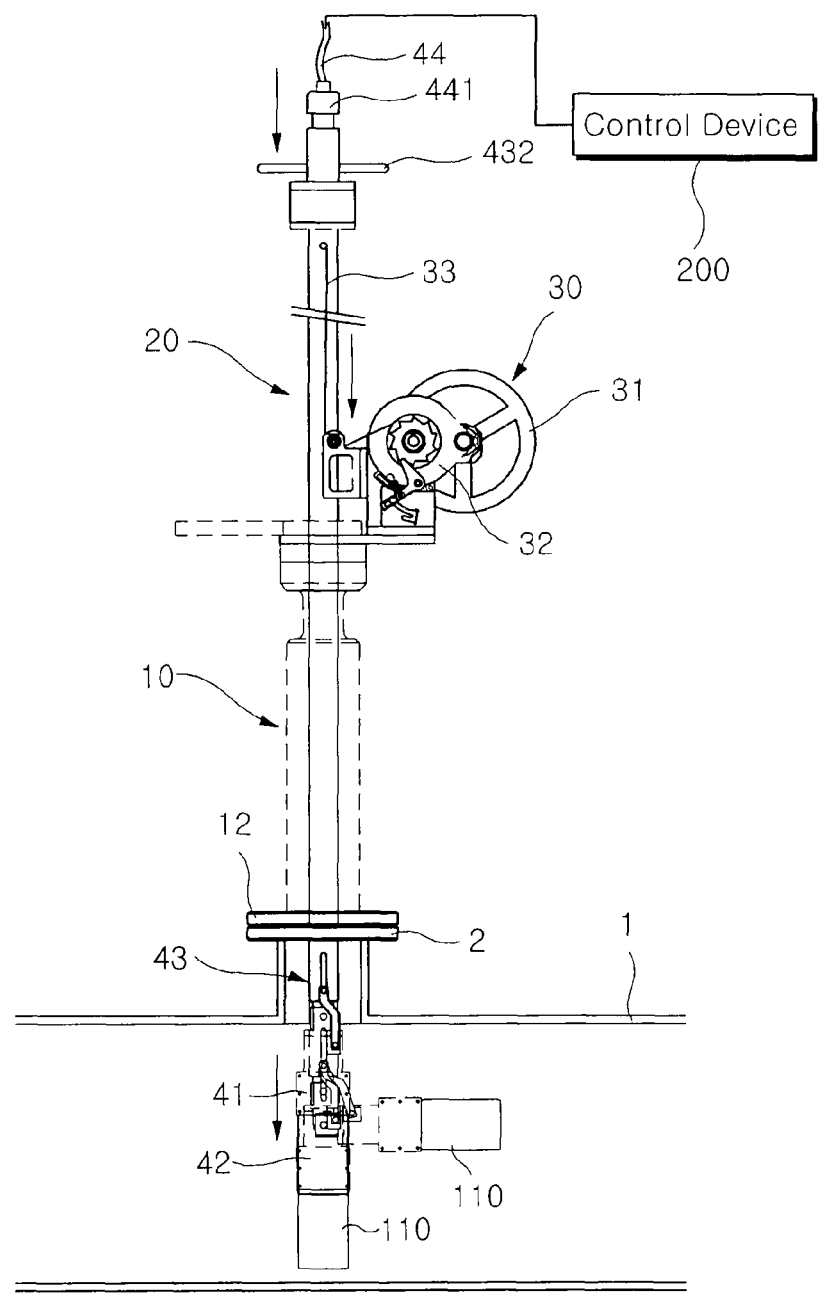
FIG. 11 is a conceptual view illustrating a preferred operational state of the system for controlling the apparatus for photographing a pipe without suspension of water supply according to the present invention.

FIG. 11 is a conceptual view illustrating a preferred operational state of the system for controlling the apparatus for photographing a pipe without suspension of water supply according to the present invention.

Referring to FIG. 11, in the system for controlling the apparatus for photographing a pipe without suspension of water supply according to the present invention, which is constituted as above, when photographing an interior of a pipe 1, a valve mounted to an end 2 of the pipe 1 is removed, and then the flange 12 of the main housing 10 is coupled to the end 2 of the pipe 1 to securely fix the main housing 10 to the pipe 1. Thereby, separation of the main housing 10 or fluid leakage through the coupling portion between the pipe 1 and the main housing 10, which might occur due to a water pressure applied to the end 2 of the pipe 1, is prevented.

Thereafter, a cable 44 connected with the camera unit 110 and the encoder unit 130 is connected to the control device 200. The manipulation handle 31 is rotated to wind the wire 33 on the pulley 32. The overall length of the wire 33 is shortened, and thus the moving shaft 20 is moved into the pipe 1. In this state, the camera unit 110 is operated to photograph the interior of the pipe 1. Thereby, the internal appearance of the pipe 1 can be photographed without halting the fluid supply into the pipe 1. The image signal corresponding to the image obtained by photographing the interior of the pipe 1 by use of the camera unit 110 is transmitted to the control board 210 through the cable 44, together with the aforementioned first signal, second signal and third signal, which are camera position signals. At the same time, the zoom information signal, the focus information signal, the camera direction signal and the temperature signal, which are outputted from the camera unit 110, may be transmitted to the control board 210, together with the image signal and the camera position signals.

Even when a high pressure is generated in the pipe 1, since the reverse-rotation of the pulley 32 is prevented by the ratchet gear 321 and the ratchet stopper 322, the moving shaft 20 can be prevented from being pushed out of the pipe 1, thereby achieving smooth photographing operation.

Moreover, it is preferred that a cable packing 441 for sealing the cable connecting passage 21 is inserted into a rear end of the moving shaft 20, so as to prevent water leakage through the cable connecting passage 21. It is also preferred that the sliding shaft operation handle 432 is provided at an outer end of the sliding shaft 431, so that a user can precisely adjust an angle of the camera unit 110 while rotating the camera unit 110 up and down by conveniently pushing or pulling the sliding shaft 431 at the exterior of the pipe 1.

As apparent from the above description, the apparatus for photographing a pipe without suspension of water supply and the system for controlling the same according to the present invention can photograph an interior of a pipe by inserting the camera into the pipe and moving and rotating the camera without halting water supply, and can produce information about the movement and rotation of the camera. Accordingly, a problem of discontinuance of using the whole pipe due to suspension of fluid flow in the pipe can be prevented, as well as the loss of fluid accompanied by maintenance and inspection of the pipe can be minimized.

Further, since the main housing is securely coupled to the end of the pipe by the flange formed at a portion of the main housing, the camera can be smoothly moved. Accordingly, the fluid is prevented from leaking through a gap between the main housing and the pipe due to a pressure of the fluid, as well as the pipe photographing apparatus can be easily mounted or removed to/from the end of the pipe.

Further, since the sealing packing is inserted between the main housing and the moving shaft, the occurrence of water leakage through a gap between the moving shaft and the main housing is prevented. Accordingly, the fluid loss is more effectively prevented, and the movement of the camera can be smoothly achieved.

Further, since the moving shaft stopper is provided to prevent the moving shaft from moving due to its own weight, the camera can be prevented from being separated from a photographing position due to undesirable movement of the moving shaft.

Further, the manipulation part, with a simple constitution of the manipulation handle, the pulley and the wire, can smoothly insert or remove the moving shaft into/out of the pipe, in which a high water pressure is generated. Accordingly, an assembling process of the manipulation part can be easily carried out, as well as the camera can be smoothly moved against an inner pressure of the pipe by simple manipulation.

Further, since the ratchet stopper is provided at a portion of the pulley to prevent the pulley being reversely rotated due to a water pressure, the moving shaft is prevented from being pushed out of the pipe due to the reverse rotation of the pulley.

Further, since the speed reduction gear is provided between the manipulation handle and the pulley to conveniently operate the moving shaft with a small force, the moving shaft can be easily and smoothly moved with a small force against a high fluid pressure in the pipe.

Further, since the camera unit is composed of the camera housing and the camera module, damage of the camera due to a water pressure is prevented, and the camera can be conveniently mounted to an end of the moving shaft and can be adjusted to be directed toward an inner wall of the pipe.

Accordingly, the camera module is easily mounted or removed to/from the moving shaft, which enables a user to conveniently maintain or repair the camera module. In addition, the inner wall of the pipe can be photographed more accurately and clearly.

Further, a photographing angle of the camera can be easily adjusted at the exterior of the pipe by the tilting operation means, which includes the sliding shaft, the sliding shaft operation handle and the tilting bracket. Accordingly, work of photographing a portion in the pipe, at which a problem occurs, can be achieved more conveniently and precisely.

Further, since the cable connecting passage is formed through the moving shaft and the cable packing is provided at a rear end of the moving shaft, the cable for applying power and transmitting a signal to the camera unit is simply arranged, and water leakage is prevented. Accordingly, exposure of the cable to the exterior is minimized, and thus damage of the cable is prevented. In addition, a loss due to water leakage is minimized.

Further, since information about forward/backward movement and left/right or up/down rotation of the camera is accurately produced without an error, a user can accurately grasp the position and direction of the camera located in the pipe.

Further, the apparatus for photographing a pipe without suspension of water supply and the system for controlling the same according to the present invention have an effect of measuring an internal state of the pipe and photographing the interior of the pipe by a high image quality.

Further, the apparatus for photographing a pipe without suspension of water supply and the system for controlling the same according to the present invention detect information about the movement and rotation of the camera, and display the information. Accordingly, a user can grasp the practical position and direction of the camera in the pipe from the displayed image, thereby more easily manipulating the camera.

Further, since the apparatus for photographing a pipe without suspension of water supply and the system for controlling the same according to the present invention provide the user interface which can receive a control command related to the camera or the display from a user, a user can easily control the camera, and can photograph a portion at a desired position in the pipe and check the photographed image.

Further, since the apparatus for photographing a pipe without suspension of water supply and the system for controlling the same according to the present invention give information about an image of the pipe as well as an internal state of the pipe to a user, a user can more accurately inspect an internal state of the pipe.

Further, since the apparatus for photographing a pipe without suspension of water supply and the system for controlling the same according to the present invention store information about a pipe image, an internal state of the pipe and a defect-position, a user can accurately and precisely re-inspect the internal state of the pipe later, and can easily grasp the defect-position.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for photographing a pipe without suspension of water supply, comprising:
   a camera unit to photograph an interior of a pipe; and
   a mechanism unit to support and to move and rotate the camera unit,
   wherein the mechanism unit is coupled to the pipe in a way to seal the pipe so as to prevent fluid leakage from the pipe, and the apparatus photographs the interior of the pipe without halting water supply into the pipe.

2. The apparatus according to claim 1, wherein the mechanism unit includes:
   a main housing coupled to an end of the pipe;
   a moving shaft inserted in the main housing to move forward and backward and rotate in the pipe, and the moving shaft being coupled with the camera unit at an end thereof; and
   a manipulation part to move the moving shaft from a portion of the main housing into the pipe.

3. The apparatus according to claim 2, wherein the main housing is formed with a through-hole, through which the moving shaft is inserted and moves, and is provided with a flange at an end thereof, which is to be coupled to an end of the pipe.

4. The apparatus according to claim 3, wherein the mechanism unit further includes a sealing packing provided in the main housing to seal a space between the moving shaft and the main housing.

5. The apparatus according to claim 3, wherein the mechanism unit further includes a moving shaft stopper provided at an outer end of the main housing to fix the movement of the moving shaft.

6. The apparatus according to claim 2, wherein the manipulation part includes:
   a manipulation handle rotatably coupled to a portion of the main housing;
   a pulley coupled to the manipulation handle so as to be rotated; and
   a wire having a first end wound on the pulley and a second end fixed to an end of the moving shaft.

7. The apparatus according to claim 6, wherein the manipulation part further includes a ratchet gear coupled to a portion of the pulley, and a ratchet stopper provided adjacent to the ratchet gear to prevent reverse rotation of the pulley.

8. The apparatus according to claim 7, wherein the manipulation part further includes a speed reduction gear provided between the manipulation handle and the pulley.

9. The apparatus according to claim 2, wherein the mechanism unit further includes a camera housing hingedly coupled to an end of the moving shaft so as to be tilted left and right, and wherein the camera unit is fixedly inserted in the camera housing.

10. The apparatus according to claim 9, wherein the mechanism unit further includes a tilting operation part to tilt the camera housing left and right at an exterior of the pipe.

11. The apparatus according to claim 10, wherein the tilting operation part includes:
   a sliding shaft provided to move forward and backward in the moving shaft; and
   a tilting bracket having a first end hingedly coupled to the sliding shaft, and a second end hingedly coupled to an outer portion of the camera housing at a position deviated from a center of the sliding shaft.

12. The apparatus according to claim 2, wherein the moving shaft is formed with a cable connecting passage through the moving shaft, through which a cable connected with the camera unit is extended outside, and the mechanism unit further includes a cable packing provided at a rear end of the moving shaft to prevent fluid leakage through the cable connecting passage.

13. An apparatus for photographing a pipe without suspension of water supply, comprising:
   a camera unit to photograph an interior of a pipe;
   a mechanism unit to support and to move and rotate the camera unit; and
   an encoder unit to produce signals corresponding to information about that the mechanism unit moves and rotates the camera unit,
   wherein the mechanism unit is coupled to the pipe in a way to seal the pipe so as to prevent fluid leakage from the pipe, and the apparatus photographs the interior of the pipe without halting water supply into the pipe.

14. The apparatus according to claim 13, wherein the encoder unit includes:
   a first encoder to produce a first signal corresponding to movement information about that the mechanism unit moves the camera unit forward and backward;
   a second encoder to produce a second signal corresponding to left/right rotation information about that the mechanism unit rotates the camera unit left and right; and
   a third encoder to produce a third signal corresponding to up/down rotation information about that the mechanism unit rotates the camera unit up and down.

15. The apparatus according to claim 13, wherein the encoder unit includes an encoder which is automatically closely contacted with the mechanism unit.

16. The apparatus according to claim 15, wherein the encoder includes a pressing spring to closely contact the encoder to the mechanism unit in one axial direction.

17. The apparatus according to claim 13, wherein the camera unit includes:
   a camera to output an image signal, a zoom information signal and a focus information signal in photographing the interior of the pipe;
   a laser device to irradiate a beam for indicating an intended direction of the camera;
   a temperature sensor to measure a temperature in the pipe and produce a temperature signal; and
   an illumination device to provide illumination for photographing the interior of the pipe.

18. A system for controlling an apparatus for photographing a pipe without suspension of water supply, comprising:
   an apparatus for photographing a pipe without suspension of water supply to output a position signal of a camera and an image signal obtained by photographing an interior of a pipe by use of the camera;
   a control board to produce camera position information and a pipe image respectively based on the position signal and the image signal outputted from the apparatus;
   a data processing part to generate a three-dimensional animation based on the camera position information and the pipe image produced by the control board; and
   an interface part to display the three-dimensional animation generated by the data processing part,
   wherein the apparatus is coupled to the pipe in a way to seal the pipe so as to prevent fluid leakage from the pipe.

19. The system according to claim 18, wherein the interface part further has a function of receiving a command inputted by a user.

20. The system according to claim 19, wherein the data processing part processes the inputted command and transmits a result value to the interface part, or controls the apparatus according to the command.

21. The system according to claim 18, wherein the apparatus further outputs a zoom information signal of the camera, a focus information signal of the camera and a temperature signal representing a temperature in the pipe.

22. The system according to claim 21, wherein the control board produces zoom information, focus information and temperature information respectively based on the zoom information signal, the focus information signal and the temperature signal outputted from the apparatus.

23. The system according to claim 22, wherein the data processing part generates a three-dimensional animation based on the position information, the pipe image, the zoom information, the focus information and the temperature information.

24. The system according to claim 22, further comprises a memory,
wherein the data processing part stores the three-dimensional animation, the position information and the pipe image in the memory, or stores the three-dimensional animation, the position information, the pipe image, the zoom information, the focus information and the temperature information in the memory.

25. The system according to claim 24, wherein the data processing part further has a defect-position processing function of recording a still image and position information with respect to a defect-position.

* * * * *